United States Patent [19]

Stauber et al.

[11] 4,294,345
[45] Oct. 13, 1981

[54] UNIVERSAL JOINT-LINK CHAIN

[75] Inventors: Hans-Ulrich Stauber, Grüt; Jürg Eberle, Hinwil, both of Switzerland

[73] Assignee: Ferag AG, Hinwil, Switzerland

[21] Appl. No.: 867,027

[22] Filed: Jan. 5, 1978

Related U.S. Application Data

[63] Continuation of Ser. No. 703,834, Jul. 9, 1976, abandoned.

[30] Foreign Application Priority Data

Jul. 28, 1975 [CH] Switzerland .................. 9810/75

[51] Int. Cl.³ ............................................. B65G 17/32
[52] U.S. Cl. ..................................... 198/683; 198/685
[58] Field of Search ............... 198/653, 683, 685, 694, 198/733, 793, 800, 844, 845, 831, 850–853, 822, 477, 678; 74/245 R, 245 C, 246, 253 R, 251 R, 251 C, 250 R, 250 C; 59/78.1; 104/172 C

[56] References Cited

U.S. PATENT DOCUMENTS

| 2,768,733 | 10/1956 | Wilson | 198/685 |
| 2,850,149 | 9/1958 | Bankauf | 198/845 |
| 2,960,210 | 11/1960 | Jorgensen | 74/246 |
| 3,338,380 | 8/1967 | Grebe | 198/822 |
| 3,575,282 | 4/1971 | Gaiotto et al. | 198/683 |

FOREIGN PATENT DOCUMENTS

| 2252268 | 7/1975 | France | 198/853 |
| 460847 | 10/1968 | Switzerland | 198/678 |

Primary Examiner—Joseph E. Valenza
Attorney, Agent, or Firm—Werner W. Kleeman

[57] ABSTRACT

A universal joint-link chain comprising a plurality of chain links, one end of each chain link being provided with a hinge body and the opposite end with a hinge socket, the hinge socket of one chain link receiving the hinge body of the neighboring chain link. Each hinge socket and each hinge body is formed as an equatorial spherical segment, and a respective shaft mounts each hinge body. Travelling wheels are provided at opposed ends of the shaft. There is also provided a substantially C-shaped guide channel which is downwardly open, has spaced apart confronting flanges and a rear channel wall oppositely spaced from said flanges. A guide wheel is arranged at the region of the travelling wheels, said guide wheel having an axis extending essentially perpendicular to a related connection element and through the center of the associated spherical segment. The confronting flanges both guide thereon the travelling wheels and therebetween the guide wheels. Support means carried by each chain link include means for the attachment of a conveyed material, and said attachment means of the support means comprise a lateral offloading attachment element. The offloading attachment element extends substantially parallel to and in vertically spaced relationship from the axis of the shaft. The lateral offloading attachment element, when loaded by said conveyed material, exerting a moment upon the travelling wheels such that one travelling wheel at an end of the shaft bears against its related flange while the other travelling wheel at the other end of the shaft bears against the rear channel wall to provide a stable position for the universal joint-link chain.

4 Claims, 3 Drawing Figures

UNIVERSAL JOINT-LINK CHAIN

CROSS-REFERENCE TO RELATED CASE

This is a continuation application of our commonly assigned U.S. application Ser. No. 703,834, filed July 9, 1976 and entitled: "Universal Joint-Link Chain" and now abandoned.

BACKGROUND OF THE INVENTION

The present invention relates to a new and improved construction of a universal joint-link chain or ball-and-socket link chain wherein each of the chain links are provided at one end with a hinge element or body and at the other end with a hinge socket, the hinge socket of one chain link receiving the hinge body of the neighboring chain link.

From Swiss Pat. No. 410,551, illustrating a typical species of a ball-and-socket link chain or universal joint-link chain of the previously mentioned type, it will be readily recognized that the universal joints which require a particular manufacturing technique due to the basic shape of the hinge bodies and hinge sockets, also pose additional constructional problems because of their mounting which further increase the cost of fabricating such chains. Additionally, such chains, in comparison to their load-carrying capability are heavy, because the hinge bodies exert a spreading action upon the hinge sockets, making it necessary to still further dimensionally increase the hinge joints which are already rather voluminous due to their construction.

SUMMARY OF THE INVENTION

Hence, it is a primary object of the present invention to provide a new and improved construction of universal jointlink chain which is not associated with the aforementioned drawbacks and limitations of the prior art proposals.

Another and more specific object of the present invention aims at the provision of a novel construction of ball-and-socket joint-link chain,—also referred to herein as a universal joint-link chain—which is relatively simple in construction and design, relatively easy and inexpensive to manufacture, extremely reliable in operation, provides a stable position for the universal joint-link chain during operation, and requires a minimum of servicing and maintenance.

Now in order to implement these and still further objects of the invention, which will become more readily apparent as the description proceeds, the universal joint-link chain of the invention is manifested by the features that the hinge sockets and hinge bodies are substantially constructed as equatorial spherical segments, and connection elements of the chain links laterally engage at the hinge bodies which are wider than the hinge sockets.

With this embodiment the hinge sockets constructed as equatorial spherical segments and thus of ring-shaped configuration are oriented essentially in the lengthwise direction of the chain links as a direct result of the lateral anchoring of the hinge bodies and engage about the hinge bodies approximately in the direction of the force to be transmitted. In this way there is firstly obtained the result that the hinge bodies do not exert any spreading action upon the hinge sockets and, secondly, there can be transmitted from one link to the other link both traction forces as well as compressive forces. In other words, such chain basically can be employed while working either in a tension or pulling mode or thrust or pushing mode of operation. Apart from elimination of the spreading action and the corresponding smaller dimensioning of the chain for a predetermined load-carrying capability, the spatial requirements are also reduced since the joints, in contrast to the conventional ball joints, possess a flattened configuration.

According to a preferred embodiment of the invention each of the connection elements possesses a bifurcated or forked portion in which the hinge body is arranged. The connection elements in each instance can be formed by two offset or bent brackets, and the hinge sockets are set in recesses or openings of the one mutually contacting end sections of the brackets. The hinge bodies arranged between the other end sections of the brackets can be positionally fixed by supporting or journal pins engaging in recesses of such end sections. Consequently, these exemplary embodiments combine the constructional, manufacturing and cost advantages and the favorable loadability of a sprocket chain with the mobility of a universal joint-link chain, without having to make those compromises which are known with regard to sprocket chains in order to impart thereto a certain lateral flexibility and/or ability to be exposed to torsional loads. Hence, the inventive universal jointlink chain basically differs from, for instance, the sprocket chain disclosed in German Pat. No. 1,303,501 where the chain links are interconnected by cross-hinges which permit lateral bending of the chain. By way of completeness there is also here mentioned German patent publication 2,106,095. In the chain disclosed therein, the chain links are connected with one another at single-axis hinges, wherein however the hinge axes are alternately rotated through 90°, so that the chain possesses two degrees of freedom of movement. Yet, in neither instance is there achieved the freedom of movement which can be obtained with a universal joint.

According to further important features of the invention, a respective shaft mounts each hinge body, each said shaft having opposed ends. There are provided travelling wheels at the opposed ends of the shaft. There is further provided a substantially C-shaped guide channel which is downwardly open, has spaced apart confronting flanges and a rear channel wall oppositely spaced from said flanges. A guide wheel is arranged at the region of the travelling wheels, said guide wheel having an axis extending essentially perpendicular to its related connection element and through the center of the associated spherical segment. The confronting flanges serve both for guiding thereon the travelling wheels and therebetween the guide wheels. Support means carried by each chain link include means for the attachment of a conveyed material. Such attachment means of the support means comprise a lateral offloading attachment element. This offloading attachment element extends substantially parallel to and in vertically spaced relationship from the axis of the shaft, and said lateral offloading attachment element, when loaded by said conveyed material, exerting a moment upon the travelling wheels such that one travelling wheel at an end of the shaft bears against its related flange while the other travelling wheel at the other end of the shaft bears against the rear channel wall to thereby provide a stable position for the universal joint-link chain.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
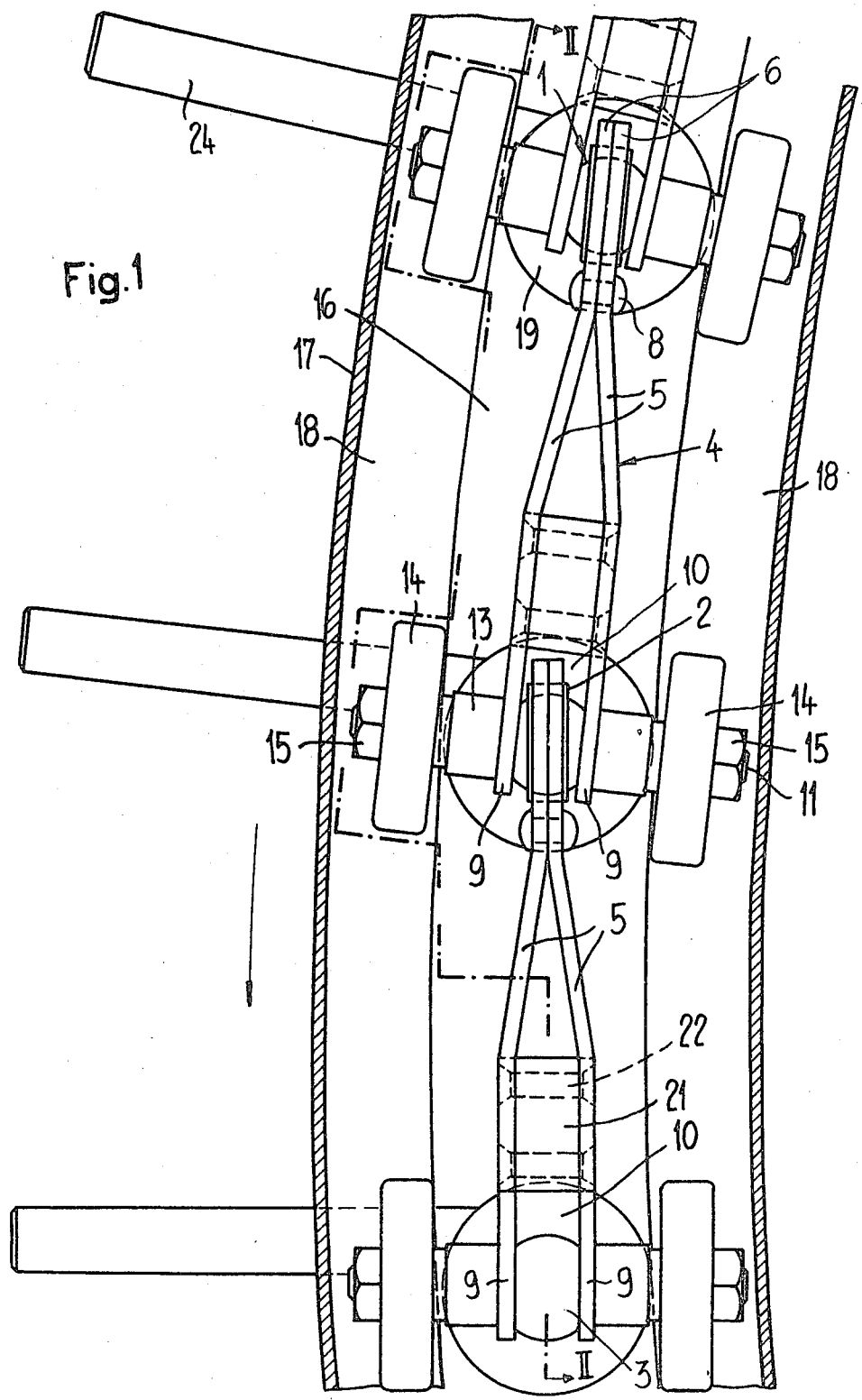
FIG. 1 is a top plan view of the guide channel which, in cross-section, possesses a C-shaped configuration and the chain travelling therein, such chain is constructed according to the present invention.
Figure 3:
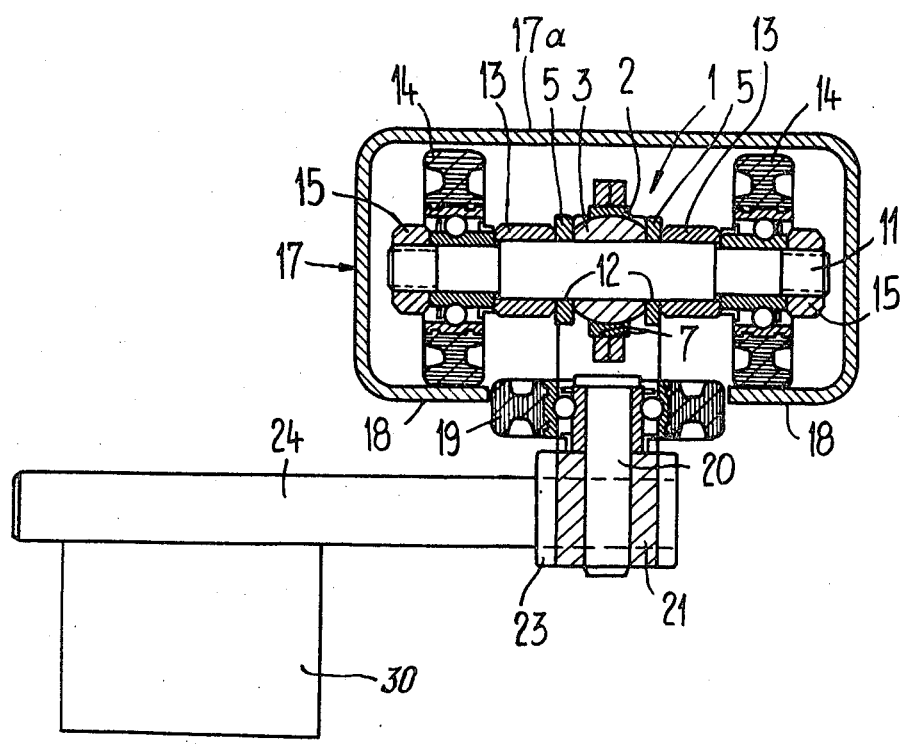
FIG. 3 is a cross-sectional view along the line III—III of FIG. 2.

Describing now the drawings, and as will be particularly recognized by referring to FIGS. 1 and 3, each universal joint, designated in its entirety by reference character 1, possesses a substantially ring-shaped swivel- or hinge-socket 2 and a swivel or hinge body or element 3 which is wider than such hinge socket. Both the hinge sockets 2 and hinge bodies or elements 3 are constructed as equatorial spherical segments. The plane of the equator of the hinge socket simultaneously constitutes the lengthwise central plane of the chain link designated in its entirety by reference character 4.

Each chain link 4 possesses connection elements in the form of offset or bent brackets or plates 5 which bear with their respective one end section 6 against one another. The hinge socket 2 is set in recesses or openings 7 of such end sections 6 which are connected by rivets 8 or other suitable fastening expedients with one another. The opposite end sections 9 of the brackets 5 form a bifurcated or forked portion 10 in which there is accommodated the associated flattened spherical hinge body 3.

The hinge body 3 has inserted therethrough, at each chain link 4, a shaft 11, as particularly well seen by referring to FIG. 3. Such shaft 11 extends through openings 12 of the end sections 9 of the brackets 5 and laterally of the brackets carries spacer sleeves 13 and at opposed ends of the shaft travelling wheels or rollers 14 which are fixed in the axial direction by the nut members 15 or the like. This arrangement ensures, apart from its constructional simplicity, also easy and rapid mounting.

Figure 2:
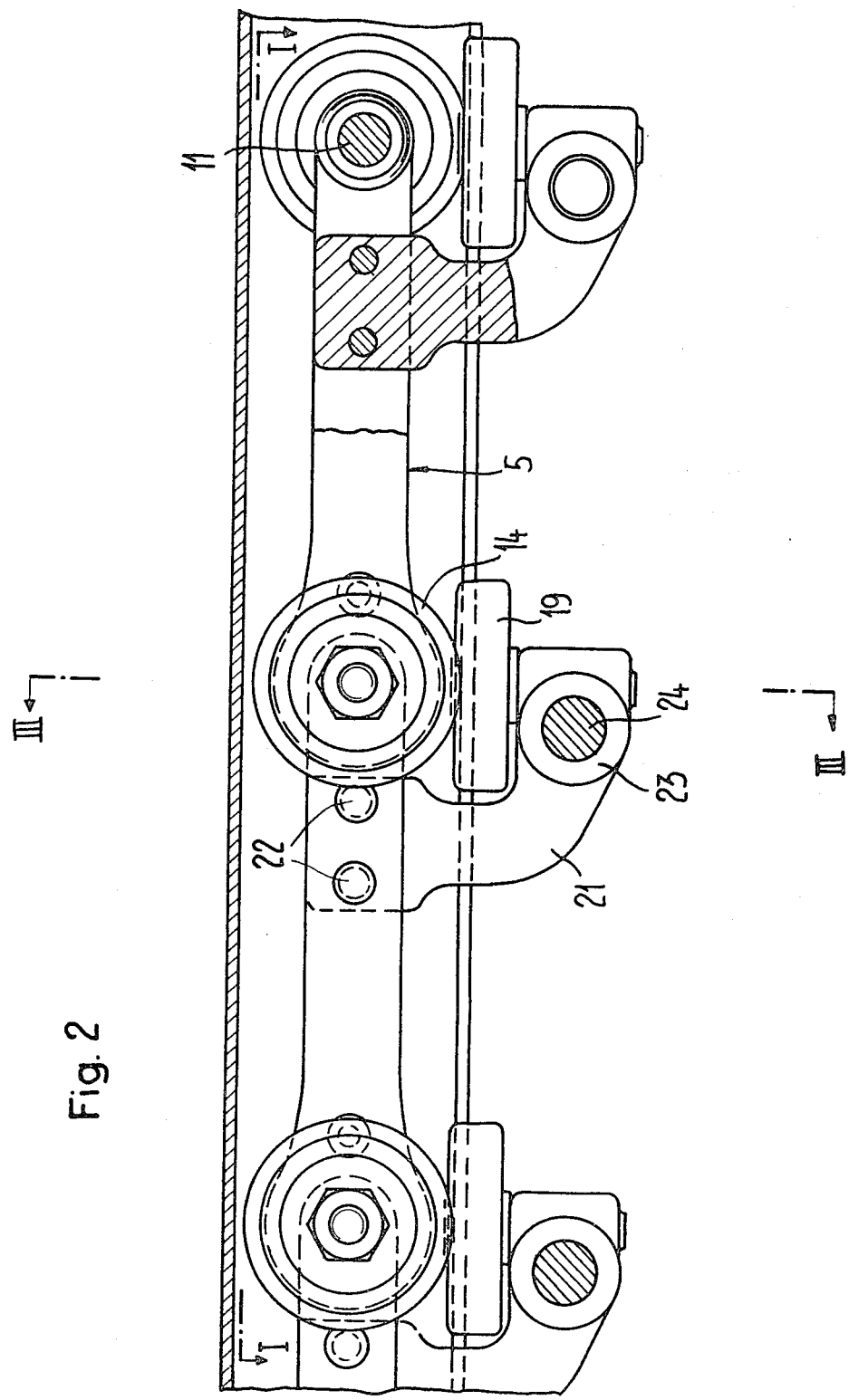
FIG. 2 is a side view of the guide channel, taken in section along the line II—II of FIG. 1, and also illustrating in partial sectional view the chain.

The travelling wheels 14 travel upon the spaced confronting flanges 18 of a guide channel 17 having a rear channel wall 17a oppositely spaced from the confronting flanges 18, these flanges bounding the slot 16 of channel 17 which in cross-section is essentially C-shaped. Between the flanges 18 there is located a guide wheel 19, the shaft 20 of which is disposed perpendicular to the brackets or plates 5 and is directed approximately towards the center of the universal joint or ball-and-socket joint 1. This shaft 20 is mounted at one end of a flexed or offset cantilever 21, as seen by referring to FIG. 2, and which cantilever engages with its other end between the end sections 9 of the brackets 5 and connected therewith by one or more rivets 22 or other suitable fastening expedients. In an eyelet 23 of the cantilever 21 there is held one end of a rod 24 which extends towards one side of the guide channel 17 or the chain, respectively, substantially parallel to and in substantially vertically spaced relationship from the axis of the related shaft 11, and serves as a laterally offloading attachment element or means for the conveyed material. With the illustrated exemplary embodiment, each chain link carries such a rod 24. The purpose of this measure will be explained hereinafter. Depending on the field of use, the number and also the shape of such attachment elements can be different.

The mode of operation of the described chain should be readily understood: it can be driven in both directions and thus can be either pulled or pushed. In both instances the operating conditions are favorable inasmuch as the travelling wheels 14, and also the guide wheel 19 are centrally arranged with respect to the universal joint. The guide channel can be straight or possess spatially curved sections, and twisting or torsion is readily possible in both instances. During the traction or pulling mode of operation the chain preferably travels in the direction indicated by the arrow appearing in FIG. 1, during the thrust or pushing operation in the opposite direction. Consequently, in the arcuate-shaped sections of the track the radial components of the traction- or thrust forces are partially compensated by the position of the travelling wheels, so that the guide wheels are relieved of load.

Furthermore, it should be apparent that since the offloading attachment element extends substantially parallel to and in vertically spaced relationship from the axis of the shaft, there is achieved the beneficial result that said lateral off-loading attachment element, when loaded by the conveyed material, exerts a moment upon the travelling wheels such that one travelling wheel at an end of the shaft bears against its related flange while the other travelling wheel at the other end of the shaft bears against the rear channel wall to provide a stable position for the universal joint-link chain.

The described embodiment is particularly useful for conveying printed products which arrive in an imbricated product stream, with the aid of controlled clamps, generally schematically represented by reference character 30 in FIG. 3, which are secured to the rods 24 and seize the leading edges of the printed products. In this manner the product copies which are carried along in the imbricated product stream are separated so they can then be individually handled, for instance for further automated processing by suitable machinery, such as by delivering the same to a stuffing machine and so forth. Due to the universal flexibility of the chain there is afforded an extensive freedom with respect to the course of the conveyor track and the arrangement of the individual processing stations. The foregoing example is to be considered as generally valid for the proposition that with the aid of the described chain it is possible to readily solve product conveying or transport problems, and also generally drive problems, while taking into account the spatial guiding of the chain. In this connection the wide gauge arrangement of the travelling wheels, with the described exemplary embodiment, is not to be considered in any way as a limitation. As will be apparent from the drawing there also can be employed, without any problem, an embodiment working with narrow gauge, and this is so because the universal joints—as mentioned—are laterally flattened. Finally, it is to be understood that the chain also can be used without any conveyor channel in the same or a comparable embodiment.

While there are shown and described present preferred embodiments of the invention, it is to be distinctly understood that the invention is not limited thereto but may be otherwise variously embodied and practiced within the scope of the following claims.
ACCORDINGLY,

What we claim is:

1. A universal joint-link chain comprising a plurality of chain links, each chain link having opposed ends, one end of each chain link being provided with a hinge body and the opposite end with a hinge socket, the hinge socket of one chain link receiving the hinge body of the neighboring chain lnk, each hinge socket and each hinge body being formed as an equatorial spherical segment, each chain link including a connection element engaging with the hinge bodies, said hinge body being wider than the hinge sockets, a shaft for mounting each hinge body, said shaft having opposed ends, travelling wheels provided at the opposed ends of the shaft, a substantially C-shaped guide channel which is downwardly open, said guide channel having spaced apart confronting flanges and a rear channel wall oppositely spaced from said flanges, a guide wheel arranged at the region of the travelling wheels, said guide wheel having an axis extending essentially perpendicular to its related connection element and through the center of the associated spherical segment, said confronting flanges serving as tracks for the travelling wheels and for guiding therebetween the guide wheels, said rear channel wall serving as a track for one of the travelling wheels when the chain carries a load, support means carried by each chain link, said support means including means for the attachment of a conveyed material, said attachment means of the support means comprising a lateral offloading attachment element, said offloading attachment element extending substantially parallel to and in vertically spaced relationship from the axis of the shaft and further extending laterally from the underside of the guide channel and transversely to the direction of movement of the chain, said lateral offloading attachment element, when loaded by said conveyed material, exerting a moment upon the travelling wheels such that one travelling wheel at an end of the shaft bears against its related flange while the other travelling wheel at the other end of the shaft bears against the rear channel wall to provide a stable position for the universal joint-link chain.

2. The universal joint-link chain as defined in claim 1, wherein each of the connection elements is constituted by two offset brackets having end sections, the hinge sockets being set in recesses of one of the end sections of the brackets, said one of the end sections abutting against the other of the end sections.

3. The universal joint-link chain as defined in claim 2, further including a support pin engaging in recesses at the other of the end sections of each of the connection elements for holding the respective hinge bodies arranged between the other of the end sections of the brackets.

4. The universal joint-link chain as defined in claim 1, wherein said support means further comprise cantilever means engaging between the brackets, the guide wheel being mounted at the cantilever means.

* * * * *